United States Patent
Ko et al.

(10) Patent No.: US 10,280,303 B2
(45) Date of Patent: May 7, 2019

(54) NON-HALOGEN THERMOPLASTIC RESIN COMPOSITION AND CABLE INCLUDING THE SAME

(71) Applicant: LG CHEM, LTD., Seoul (KR)

(72) Inventors: Gun Ko, Daejeon (KR); Sung Hwan Lim, Daejeon (KR); Byung Wook Lee, Daejeon (KR); Soo Min Lee, Daejeon (KR); Sang Wook Na, Daejeon (KR); Sung Moon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 13 days.

(21) Appl. No.: 15/543,533

(22) PCT Filed: Nov. 24, 2016

(86) PCT No.: PCT/KR2016/013599
§ 371 (c)(1),
(2) Date: Jul. 13, 2017

(87) PCT Pub. No.: WO2017/095072
PCT Pub. Date: Jun. 8, 2017

(65) Prior Publication Data
US 2018/0002523 A1 Jan. 4, 2018

(30) Foreign Application Priority Data

Dec. 3, 2015 (KR) .................. 10-2015-0171106

(51) Int. Cl.
| | | |
|---|---|---|
| *C08K 5/51* | (2006.01) | |
| *C08L 23/16* | (2006.01) | |
| *C08L 67/02* | (2006.01) | |
| *C08L 67/03* | (2006.01) | |
| *C08L 71/02* | (2006.01) | |

(52) U.S. Cl.
CPC ............... *C08L 67/03* (2013.01); *C08K 5/51* (2013.01); *C08L 23/16* (2013.01); *C08L 67/025* (2013.01); *C08L 71/02* (2013.01)

(58) Field of Classification Search
None
See application file for complete search history.

(56) References Cited

U.S. PATENT DOCUMENTS

| 4,639,486 A | 1/1987 | Liu |
|---|---|---|
| 2005/0250885 A1 | 11/2005 | Mercx et al. |
| 2010/0044070 A1 | 2/2010 | Schmidt |
| 2010/0309571 A1 | 12/2010 | Watari et al. |
| 2013/0327558 A1 | 12/2013 | Karayianni et al. |
| 2014/0058019 A1* | 2/2014 | Na .................. C08L 67/025 |
| | | 524/100 |

FOREIGN PATENT DOCUMENTS

| KR | 20110093067 A | 8/2011 |
|---|---|---|
| KR | 1020130100923 A1 | 9/2013 |
| KR | 1020140007816 A1 | 1/2014 |

OTHER PUBLICATIONS

International Search Report from PCT/KR2016/013599, dated Feb. 21, 2017.
Written Opinion of the ISA from PCT/KR2016/013599, dated Feb. 21, 2017.
XP-055491768: LG Chem: "Keyflex BT 1055D Injection Molding, TPC-ET," (retrieved on Jul. 11, 2018) pp. 1-2.

* cited by examiner

*Primary Examiner* — Ana L. Woodward
(74) *Attorney, Agent, or Firm* — Dentons US LLP

(57) ABSTRACT

The present invention relates to a non-halogen thermoplastic resin composition and a cable including the same. More particularly, the present invention provides a non-halogen thermoplastic resin composition in which a halogen-based flame retardant causing environmental and human health problems is not included and the content of a phosphorus flame retardant causing decrease in appearance and properties is decreased, but which has identical or superior mechanical strength, chemical resistance, heat resistance, and flame retardancy, compared to existing thermoplastic resin compositions, and a cable including the same.

11 Claims, 3 Drawing Sheets

NON-HALOGEN THERMOPLASTIC RESIN COMPOSITION AND CABLE INCLUDING THE SAME

This application is a National Stage Application of International Application No. PCT/KR2016/013599, filed Nov. 24, 2016, and claims the benefit of Korean Patent Application No. 10-2015-0171106, filed Dec. 3, 2015, contents of which are incorporated herein by reference in their entirety for all purposes as if fully set forth below.

CROSS-REFERENCE TO RELATED APPLICATION

This application claims the priority benefit of Korean Patent Application No. 10-2015-0171106, filed on Dec. 3, 2015 in the Korean Intellectual Property Office, the disclosure of which is incorporated herein by reference.

TECHNICAL FIELD

The present invention relates to a non-halogen thermoplastic resin composition and a cable including the same. More particularly, the present invention relates to a non-halogen thermoplastic resin composition in which a halogen-based flame retardant causing environmental and human health problems is not included and the content of a phosphorus flame retardant causing decrease in appearance and properties is decreased, but which has identical or superior mechanical strength, chemical resistance, heat resistance, and flame retardancy, compared to existing thermoplastic resin compositions, and a cable including the same.

BACKGROUND ART

In general, wires are constituted of a metal part, i.e., a current-carrying conductor, and an insulative jacket surrounding the exterior of the conductor to protect the conductor and withstand operating voltage. Particularly, PVC is mainly used as a material of the insulative jacket because PVC has advantages such as economic efficiency, due to low cost, superior processability, and flame retardancy. However, PVC and the like, which include a halogen compound such as chlorine, generate toxic gases, such as dioxin and hydrogen chloride, which are toxic to the environment and humans, during an incineration process. These gases are also known carcinogens. Accordingly, use of resins including a halogen-based flame retardant is being regulated, whereby research into a jacket material that can replace such resins is underway. Particularly, as a substitute for a PVC cable, a polyolefin cable including metal hydroxide, such as magnesium hydroxide or aluminum hydroxide, as a non-halogen flame retardant is being used. However, since such a flame retardant containing metal hydroxide should be disadvantageously used in a large amount to exhibit sufficient flame retardancy, flexibility, elongation, and other properties required in a cable are deteriorated.

In connection with this, a thermoplastic polyether ester elastomer resin having superior mechanical strength, chemical resistance, heat resistance, and weather resistance is being used in various industries. However, since such a thermoplastic polyether ester elastomer resin has poor flame retardancy, utilization thereof has been relatively limited. Accordingly, methods of using the thermoplastic polyether ester elastomer along with a flame retardant so as to provide flame retardancy to the thermoplastic polyether ester elastomer have been developed.

However, when a flame retardant is added to the polyether ester-based elastomer resin, mechanical properties, such as tensile strength, elongation rate, and heat resistance, of a resin are deteriorated. To address such property deterioration, a flame retardant should be added in a minimal amount. However, when the flame retardant content is decreased, flame retardancy is not exhibited. Therefore, there is an urgent need for development of a method of securing sufficient flame retardancy while lowering the content of a flame retardant used in the polyether ester-based elastomer resin and preventing property deterioration due to application of a flame retardant.

RELATED ART DOCUMENT

[Patent Document] (Patent Document 1) U.S. Pat. No. 4,639,486 A

DISCLOSURE

Technical Problem

Therefore, the present invention has been made in view of the above problems, and it is one object of the present invention to provide a non-halogen thermoplastic resin composition in which a halogen-based flame retardant causing environmental and human health problems is not included and the content of a phosphorus flame retardant causing decrease in appearance and properties is decreased, but which has identical or superior mechanical strength, chemical resistance, heat resistance, and flame retardancy, compared to existing thermoplastic resin compositions.

It is another object of the present invention to provide a cable including the non-halogen thermoplastic resin composition.

The above and other objects can be accomplished by the present disclosure described below.

Technical Solution

In accordance with one aspect of the present invention, provided is a non-halogen thermoplastic resin composition including 45 to 70% by weight of a thermoplastic elastomer copolymer having a melt index (230° C., 2.16 kg) of greater than 5 g/10 min and 30 g/10 min or less, 10% by weight or more and less than 40% by weight of polybutylene terephthalate; and 5 to 30% by weight of a phosphorus flame retardant.

In accordance with another aspect of the present invention, there is provided a cable including the non-halogen thermoplastic resin composition.

Advantageous Effects

As apparent from the fore-going, the present invention advantageously provides a non-halogen thermoplastic resin composition in which a halogen-based flame retardant causing environmental and human health problems is not included and the content of a phosphorus flame retardant causing decrease in appearance and properties is decreased, but which has identical or superior mechanical strength, chemical resistance, heat resistance, and flame retardancy, compared to existing thermoplastic resin compositions, and a cable including the same.

BEST MODE

Figure 1:
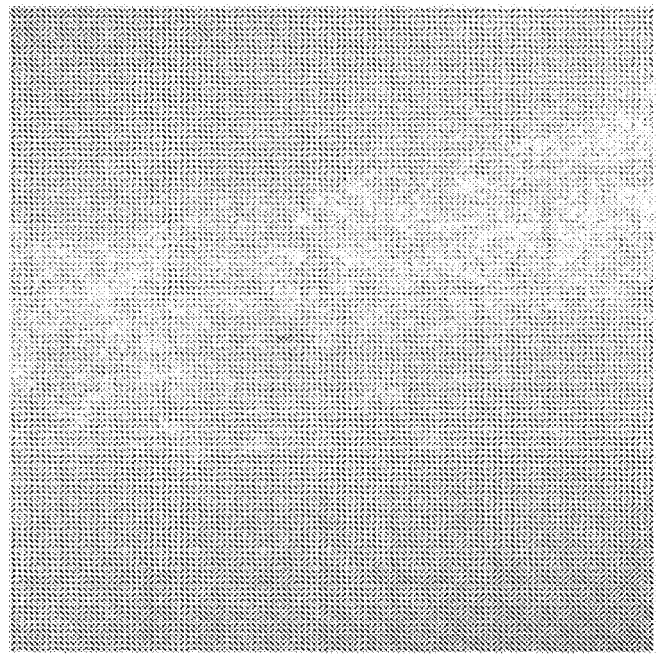
FIG. 1 illustrates an actual image of a surface, which is viewed with 50× magnification, of a cable specimen prepared according to Example 1.

Hereinafter, the present invention is described in detail.

The present inventors confirmed that, when a thermoplastic elastomer copolymer, which has a melt index within a specific range, and polybutylene terephthalate are included in predetermined contents in a non-halogen thermoplastic resin composition, the content of a phosphorus flame retardant in the non-halogen thermoplastic resin composition is decreased, but the non-halogen thermoplastic resin composition exhibits mechanical properties and flame retardancy identical or superior to those of existing thermoplastic resin compositions, thus completing the present invention.

The expression "non-halogen" refers to a substance which does not contain a halogen element such as a halogen-based flame retardant causing environmental and human health problems. That is, the non-halogen thermoplastic resin composition is a halogen-free composition.

Hereinafter, the non-halogen thermoplastic resin composition according to the present invention is described in detail.

The non-halogen thermoplastic resin composition includes 45 to 70% by weight of a thermoplastic elastomer copolymer having a melt index (230° C., 2.16 kg) of greater than 5 g/10 min and 30 g/10 min or less, 10% by weight or more and less than 40% by weight of polybutylene terephthalate; and 5 to 30% by weight of a phosphorus flame retardant.

The thermoplastic elastomer copolymer may have, for example, a Shore D hardness of 28 to 72, 28 to 50, or 28 to 38. Within this range, superior mechanical properties are exhibited.

The thermoplastic elastomer copolymer may include, for example, 30 to 65% by weight of a soft segment derived from polyalkylene glycol and 40 to 80% by weight of a hard segment derived from polyester. Within this range, superior mechanical properties and flame retardancy are exhibited.

The polyalkylene glycol may be, for example, one or more selected from the group consisting of polyethylene glycol, polypropylene glycol, polytetramethylene glycol, poly-1,2-butylene glycol, polypentylene glycol, polyhexylene glycol, polyheptylene glycol, polyoctylene glycol, polynonylene glycol, and polydecylene glycol. Preferably, the polyalkylene glycol is polypropylene glycol or polytetramethylene glycol. In this case, superior mechanical properties and property balance are exhibited.

The polyester may be, for example, derived from an aromatic dicarboxylic acid or an esterification derivative thereof; and an aliphatic diol. As a particular example, the polyester may be derived from esterification between aromatic dicarboxylic acid and an aliphatic diol, or transesterification between an aromatic dicarboxylic acid esterification derivative and an aliphatic diol.

The aromatic dicarboxylic acid or the esterification derivative thereof may be, for example, one or more selected from the group consisting of terephthalic acid, isophthalic acid, 2,6-naphthalene dicarboxylic acid, 1,5-naphthalene dicarboxylic acid, 1,4-cyclohexane dicarboxylic acid, dimethyl terephthalate, dimethyl isophthalate, 2,6-dimethyl naphthalene dicarboxylate, and dimethyl 1,4-cyclohexane dicarboxylate. Preferably, the aromatic dicarboxylic acid or the esterification derivative thereof is dimethyl terephthalate. In this case, superior mechanical properties and property balance are exhibited.

The aliphatic diol may be, for example, a lower aliphatic diol. As a particular example, the aliphatic diol may be one or more selected from the group consisting of ethylene glycol, propylene glycol, 1,2-propanediol, 1,3-propanediol, 1,4-butanediol, 1,5-pentanediol, 1,6-hexanediol, and 1,4-cyclohexanedimethanol.

The polyester may be, for example, one or more selected from the group consisting of polyethylene terephthalate, polybutylene terephthalate, polytrimethylene terephthalate, and polycyclohexylenedimethylene terephthalate.

The thermoplastic elastomer copolymer may be prepared, for example, by melt-polycondensing the polytetramethylene glycol and polyester. By such melt-polycondensing, the soft segment is derived from the polytetramethylene glycol and the hard segment is derived from the polyester.

The soft segment may be included, for example, in an amount of 20 to 65% by weight or 30 to 65% by weight with respect to the thermoplastic elastomer copolymer. The hard segment may be included, for example, in an amount of 35 to 80% by weight, or 40 to 80% by weight with respect to the thermoplastic elastomer copolymer. Within this range, superior mechanical properties and flame retardancy are exhibited.

The thermoplastic elastomer copolymer may have, for example, a melt index (230° C., 2.16 kg) of greater than 5 g/10 min and 30 g/10 min or less, 8 to 25 g/10 min, or 10 to 18 g/10 min. Within this range, superior tensile strength, elongation, and heat resistance are exhibited.

The thermoplastic elastomer copolymer may be included, for example, in an amount of 45 to 70% by weight, 45 to 65% by weight, or 45 to 60% by weight with respect to the non-halogen thermoplastic resin composition. Within this range, superior mechanical properties and property balance are exhibited.

The polybutylene terephthalate is provided to improve mechanical properties and flame retardancy while reducing the content of a phosphorus flame retardant in the non-halogen thermoplastic resin composition. The polybutylene terephthalate may have, for example, a weight average molecular weight of 10,000 to 100,000 g/mol, 15,000 to 80,000 g/mol, or 20,000 to 40,000 g/mol. Within this range, superior mechanical properties and flame retardancy are exhibited.

The polybutylene terephthalate may have, for example, an intrinsic viscosity of 0.8 to 2.0 dL/g, 1.0 to 1.5 dL/g, or 1.1 to 1.3 dL/g. Within this range, superior mechanical properties and flame retardancy are exhibited.

The polybutylene terephthalate may have, for example, a melt index (230° C., 2.16 kg) of 5 to 30 g/10 min, 5 to 20 g/10 min, or 8 to 15 g/10 min. Within this range, superior mechanical properties are exhibited.

The polybutylene terephthalate may be included, for example, in an amount of 10% by weight or more and less than 40% by weight, 15 to 35% by weight, or 20 to 30% by weight with respect to the non-halogen thermoplastic resin composition. Within this range, superior mechanical properties and flame retardancy are exhibited.

The phosphorus flame retardant may be, for example, a solid or liquid (room temperature) phosphorus flame retardant. For example, the phosphorus flame retardant may be a general flame retardant used to provide flame retardancy to a synthetic resin or a resin composition. As a particular example, the phosphorus flame retardant may be one or more selected from the group consisting of a phosphate ester compound, phosphate, pyrophosphate, phosphonate, metal-substituted phosphinate, phosphanate, and metal phosphate.

The phosphate ester compound may be, for example, a phosphate compound having an alkyl group or an aromatic group. As a particular example, the phosphate ester compound may be one or more selected from the group consisting of trimethyl phosphate, triethyl phosphate, tributyl phosphate, trioctyl phosphate, triphenyl phosphate, tricresyl phosphate, trixylenyl phosphate, cresyl diphenyl phosphate, octyl diphenyl phosphate and an aromatic diphosphate represented by Formula 1 below:

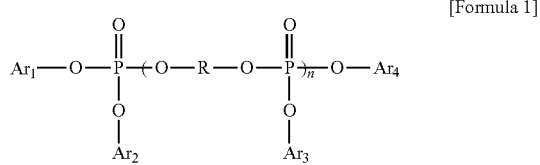

[Formula 1]

wherein $Ar_1$, $Ar_2$, $Ar_3$ and $Ar_4$ may be, for example, each independently or simultaneously a phenyl group or an aryl group substituted with one to three $C_1$ to $C_4$ alkyl groups, R may be, for example, phenylene or

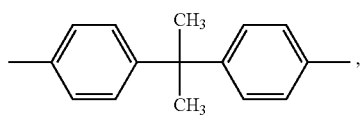

and n may be, for example, 1 to 5.

The metal phosphate may be, for example, aluminum dialkyl phosphate.

The phosphorus flame retardant may be included, for example, in an amount of 5 to 30% by weight, 10 to 25% by weight, or 10 to 20% by weight with respect to the non-halogen thermoplastic resin composition. Within this range, superior flame retardancy is provided with identical or superior mechanical properties compared to existing cases.

The non-halogen thermoplastic resin composition, for example, may further include a nitrogen-based flame retardant along with the phosphorus flame retardant to increase flame retardancy.

The nitrogen-based flame retardant may be, for example, a general flame retardant used to increase flame retardancy of a synthetic resin or a resin composition. For example, the nitrogen-based flame retardant may be a melamine or a melamine derivative.

The nitrogen-based flame retardant may be, for example, melamine, melamine cyanurate, a melem-phosphoric acid reaction product, or a mixture thereof.

As another example, the nitrogen-based flame retardant may be one or more selected from the group consisting of melamine phosphate, melamine pyrophosphate, and a melamine polyphosphate.

The nitrogen-based flame retardant may be included, for example, in an amount of 1 to 20% by weight, 3 to 15% by weight, or 5 to 10% by weight with respect to the non-halogen thermoplastic resin composition. Within this range, superior flame retardancy is provided.

The non-halogen thermoplastic resin composition may include, for example, one or more additives selected from the group consisting of a lubricant, an antioxidant, a light stabilizer, a chain extender, a reactive catalyst, a releasing agent, a pigment, a dye, an antistatic agent, a crosslinking agent, an antimicrobial agent, a processing aid, a metal deactivator, a flame retardant, a fluorine-based anti-dripping agent, an inorganic filler, glass fiber, an anti-wear and anti-abrasion agent, and a coupling agent within a range within which the properties of the non-halogen thermoplastic resin composition are not decreased.

The additive may be included, for example, in an amount of 0.1 to 10% by weight, 0.1 to 5% by weight, or 1 to 3% by weight with respect to the non-halogen thermoplastic resin composition.

The non-halogen thermoplastic resin composition may have, for example, a melt index (230° C., 2.16 kg) of 8.5 to 20 g/10 min, 9 to 15 g/10 min, or 10 to 14 g/10 min.

For example, the non-halogen thermoplastic resin composition may be aged at 121° C. for 168 hours, and then may exhibit a tensile strength change rate of 60 to 70% or 64 to 70% and a tensile elongation change rate of 60 to 80% or 63 to 74%.

For example, the non-halogen thermoplastic resin composition may be aged at 136° C. for 168 hours, and then may exhibit a tensile strength change rate of 40 to 70% or 48 to 60% and a tensile elongation change rate of 40 to 60% or 45 to 55%.

A cable according to the present invention is characterized by including the non-halogen thermoplastic resin composition.

The cable may be, for example, an extrusion-molded product manufactured by extruding the non-halogen thermoplastic resin composition and the like. As a particular example, an outermost layer of the cable may be jacketed with the non-halogen thermoplastic resin composition.

The cable may be, for example, a multi-core cable.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Examples 1 and 2 and Comparative Examples 1 to 3

A thermoplastic elastomer copolymer, polybutylene terephthalate, polyethylene terephthalate, a phosphorus flame retardant, a nitrogen-based flame retardant, and an additive were mixed in contents (% by weight) summarized Table 1 below by means of a super mixer. Subsequently, a resultant mixture was pelletized by melting and kneading in a temperature range of 200 to 270° C. by means of a twin-screw extruder. Subsequently, the pelletized product was dried at 80° C. for four hours or more, and then manufactured into a specimen for property measurement by means of an injection machine.

Test Example

The properties of a non-halogen thermoplastic resin composition specimen obtained according to each of Examples 1 and 2 and Comparative Examples 1 to 3 were measured according to the following methods. Results are summarized in Table 1 below.

Measurement Methods

Melt index (g/10 min): A specimen was retained under a load of 2.16 kg at 230° C. for four minutes according to a standard measurement method, ASTM D1238, and then the melt index thereof was measured.

Tensile strength and tensile elongation (kgf/cm$^2$ and %): The tensile strength (kgf/cm$^2$) and tensile elongation (%) of a specimen were respectively measured at room temperature (20 to 26° C.) according to a standard measurement method, UL1581.

Tensile property change rate after aging (%): A specimen was aged for 168 hours at each of 121° C. and 136° C. according to a standard measurement method, UL1581, and then the tensile strength and tensile elongation of the specimen were measured as described above. The measured tensile strength and tensile elongation were represented as a percentage with respect to an initial tensile strength and tensile elongation.

Hardness (Shore A): The hardness of a specimen was measured according to a standard measurement method, ASTM D2240.

Flame retardancy (UL94 and VW-1): A time ($1^{st}$) at which a first flame on a specimen was extinguished and a time ($2^{nd}$) at which a second flame on the specimen was extinguished were measured, and a total extinguishment time was represented as ($1^{st}+2^{nd}$, s) according to the UL 94 vertical combustion test method. Whether the specimen met the VW-1 standard was measured according to a method specified in UL 1581.

TABLE 1

| Classification | Examples | | Comparative Examples | | |
|---|---|---|---|---|---|
| | 1 | 2 | 1 | 2 | 3 |
| TPEE 1 | 50 | 53 | — | 37 | 53 |
| TPEE 2 | — | — | 53 | — | — |
| PBT | 22 | 24 | 24 | 40 | — |
| PET | — | — | — | — | 24 |
| Phosphorus flame retardant | 17.5 | 15.5 | 15.5 | 15.5 | 15.5 |
| Nitrogen-based flame retardant | 8 | 5 | 5 | 5 | 5 |
| Additive | 2.5 | 2.5 | 2.5 | 2.5 | 2.5 |
| *Properties | | | | | |
| Melt index | 10.1 | 13.4 | 12.8 | 8.2 | 2.2 |
| Tensile strength | <120 | <130 | <150 | <140 | <100 |
| Tensile elongation | <410 | <460 | <370 | <190 | <300 |
| Tensile strength change rate after aging at 121° C. | <65 | <70 | <62 | <69 | <63 |
| Tensile elongation change rate after aging at 121° C. | <64 | <74 | <28 | <44 | <55 |

TABLE 1-continued

| Classification | Examples | | Comparative Examples | | |
|---|---|---|---|---|---|
| | 1 | 2 | 1 | 2 | 3 |
| Tensile strength change rate after aging at 136° C. | <50 | <60 | <60 | <60 | <60 |
| Tensile elongation change rate after aging at 136° C. | <50 | <50 | <30 | <30 | <40 |
| Hardness | 95.5 | 95.0 | 96.5 | 96.5 | 94.5 |
| Flame retardancy UL 94 (1st + 2nd) | 4.0 | 3.0 | 2.4 | 3.4 | 8.9 |
| VW-1 | Pass | Pass | Pass | Fail | Fail |

*TPEE 1: Product name: BT1033D (melt index (230° C., 2.16 kg): 12 g/10 min, Shore D hardness: 31), manufactured by LG Chemistry.
*TPEE 2: Product name: BT2140D (melt index (230° C., 2.16 kg): 5 g/10 min, Shore D hardness: 39), manufactured by LG Chemistry.
*PBT: Product name: SV6120, manufactured by LG Chemistry.
*PET: Product name: BL8055, manufactured by LG Chemistry.
*Phosphorus flame retardant: Product name: Exolit OP 1240, manufactured by Clariant.
*Nitrogen-based flame retardant: Melamine cyanurate.
*Additive: Including a coupling agent (product name: DOW CORNING 11-100, manufactured by Dow Corning) and a lubricant (product name: Kristalex F100, manufacture by Eastman Chemical Company).

Figure 2:
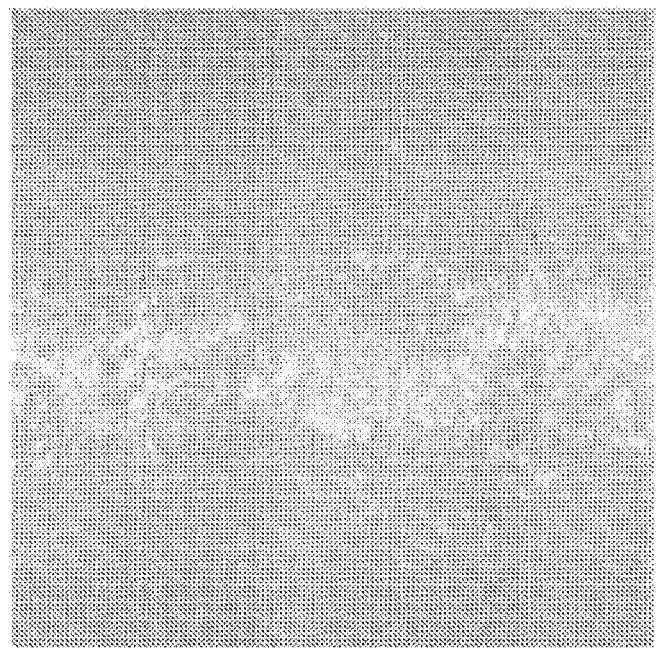
FIG. 2 illustrates an actual image of a surface, which is viewed with 50× magnification, of a cable specimen prepared according to Example 2.
Figure 3:
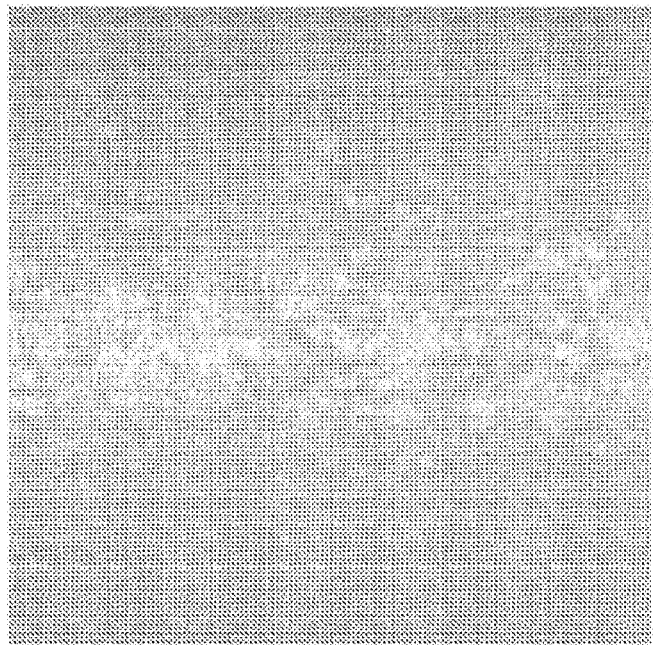
FIG. 3 illustrates an actual image of a surface, which is viewed with 50× magnification, of a cable specimen prepared according to Comparative Example 1.
Figure 4:
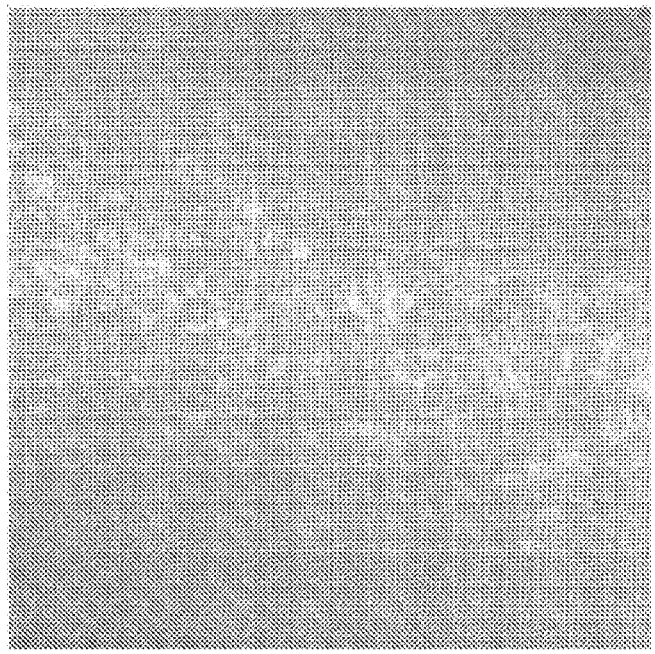
FIG. 4 illustrates an actual image of a surface, which is viewed with 50× magnification, of a cable specimen prepared according to Comparative Example 2.
Figure 5:
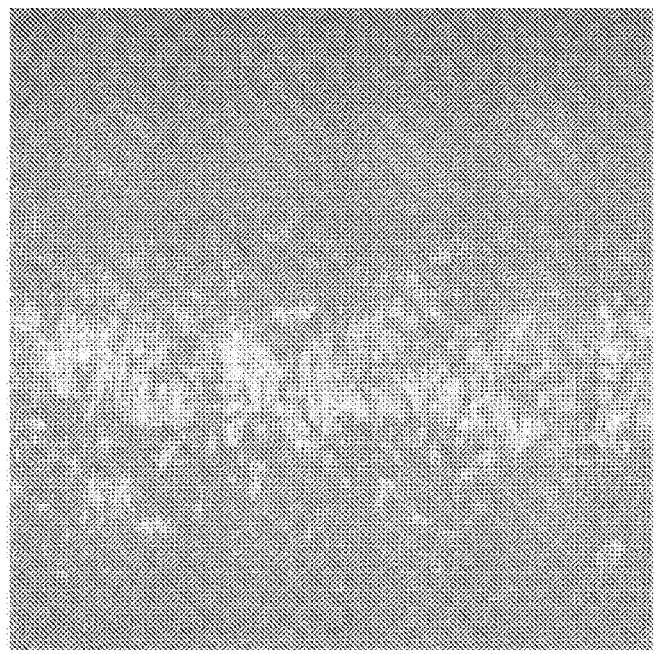
FIG. 5 illustrates an actual image of a surface, which is viewed with 50× magnification, of a cable specimen prepared according to Comparative Example 3.

As shown in Table 1, it can be confirmed that the specimens of Examples 1 and 2 manufactured according to the present invention exhibit superior melt index, tensile strength, and tensile elongation, excellent heat resistance due to a small tensile strength change rate and a small tensile elongation change rate after being aged at 121° C. and 136° C., and superior flame retardancy while maintaining hardness and appearance (FIGS. 1 and 2) identical to those of an existing specimen.

On the other hand, it can be confirmed that, in the case of Comparative Example 1 in which a thermoplastic elastomer copolymer having a low melt index was used, tensile strength and a tensile elongation change rate are rapidly decreased after being aged at 121° C. and 136° C. In addition, it can be confirmed that, in the case of Comparative Example 2 in which the thermoplastic elastomer copolymer and polybutylene terephthalate were used outside the range of the present invention, tensile strength and a tensile elongation change rate are rapidly decreased after being aged at 121° C. and 136° C. and flame retardancy is very poor.

Further, it can be confirmed that, in the case of Comparative Example 3 in which polyethylene terephthalate was used instead of polybutylene terephthalate, melt index, tensile strength, and tensile elongation are decreased, tensile strength and a tensile elongation change rate are also decreased after being aged at 121° C. and 136° C., and flame retardancy is also very poor.

From these results, the present inventors confirmed that, when a thermoplastic elastomer copolymer, which has a melt index within a specific range, and polybutylene terephthalate are included in predetermined contents in a non-halogen thermoplastic resin composition, the content of a phosphorus flame retardant in the non-halogen thermoplastic resin composition is decreased, but the non-halogen thermoplastic resin composition exhibits mechanical properties and flame retardancy identical or superior to existing thermoplastic resin compositions.

The invention claimed is:

1. A non-halogen thermoplastic resin composition, comprising:
45 to 60% by weight of a thermoplastic elastomer copolymer having a melt index (230° C., 2.16 kg) of 10 to 18 g/10 min and a Shore D hardness of 28 to 38; 20 to 30% by weight of polybutylene terephthalate; 10 to 20% by weight of a phosphorus flame retardant; 5 to 10% by weight of a nitrogen-based flame retardant; and 1 to 3% by weight of an additive, with respect to the non-halogen thermoplastic resin composition, wherein the additive is a mixture of a coupling agent and a lubricant.

2. The non-halogen thermoplastic resin composition according to claim 1, wherein the thermoplastic elastomer copolymer comprises 20 to 65% by weight of a soft segment derived from polyalkylene glycol and 35 to 80% by weight of a hard segment derived from polyester.

3. The non-halogen thermoplastic resin composition according to claim 2, wherein the polyalkylene glycol is one or more selected from the group consisting of polyethylene glycol, polypropylene glycol, polytetramethylene glycol, poly-1,2-butylene glycol, polypentylene glycol, polyhexylene glycol, polyheptylene glycol, polyoctylene glycol, polynonylene glycol, and polydecylene glycol.

4. The non-halogen thermoplastic resin composition according to claim 2, wherein the polyester is derived from an aromatic dicarboxylic acid or an esterification derivative thereof; and an aliphatic diol.

5. The non-halogen thermoplastic resin composition according to claim 1, wherein the polybutylene terephthalate has a weight average molecular weight of 10,000 to 100,000 g/mol.

6. The non-halogen thermoplastic resin composition according to claim 1, wherein the phosphorus flame retardant is one or more selected from the group consisting of a phosphate ester compound, phosphate, pyrophosphate, phosphonate, metal-substituted phosphinate, phosphanate, and metal phosphate.

7. The non-halogen thermoplastic resin composition according to claim 1, wherein the nitrogen-based flame retardant is a melamine or a melamine derivative.

8. The non-halogen thermoplastic resin composition according to claim 1, wherein the non-halogen thermoplastic resin composition has a melt index (230° C., 2.16 kg) of 8.5 to 20 g/10 min.

9. The non-halogen thermoplastic resin composition according to claim 1, wherein the non-halogen thermoplastic resin composition is aged at 121° C., and then exhibits a tensile strength change rate of 60 to 70% and a tensile elongation change rate of 60 to 80%.

10. The non-halogen thermoplastic resin composition according to claim 1, wherein the non-halogen thermoplastic resin composition is aged at 136° C., and then exhibits a tensile strength change rate of 40 to 70% and a tensile elongation change rate of 40 to 60%.

11. A cable comprising the non-halogen thermoplastic resin composition according to claim 1.

* * * * *